United States Patent
Hunt et al.

(10) Patent No.: US 12,287,244 B2
(45) Date of Patent: Apr. 29, 2025

(54) HOT-SPOT DETECTION IN ELECTRICAL DEVICES

(71) Applicant: Dyson Technology Limited, Wiltshire (GB)

(72) Inventors: Ian Andrew Hunt, Bristol (GB); Alex Madsen, Swindon (GB)

(73) Assignee: Dyson Technology Limited, Malmesbury (GB)

( * ) Notice: Subject to any disclaimer, the term of this patent is extended or adjusted under 35 U.S.C. 154(b) by 443 days.

(21) Appl. No.: 17/785,883

(22) PCT Filed: Dec. 4, 2020

(86) PCT No.: PCT/GB2020/053120
§ 371 (c)(1),
(2) Date: Jun. 15, 2022

(87) PCT Pub. No.: WO2021/123735
PCT Pub. Date: Jun. 24, 2021

(65) Prior Publication Data
US 2023/0021324 A1    Jan. 26, 2023

(30) Foreign Application Priority Data

Dec. 16, 2019 (GB) ..................... 1918464

(51) Int. Cl.
*G01K 1/143* (2021.01)
*G01K 3/14* (2006.01)
*H01M 10/48* (2006.01)

(52) U.S. Cl.
CPC ............ *G01K 1/143* (2013.01); *G01K 3/14* (2013.01); *H01M 10/486* (2013.01)

(58) Field of Classification Search
CPC .... G01K 1/143; G01K 3/14; G01K 2003/145; G01K 7/22; G01K 7/223; H01M 10/486
See application file for complete search history.

(56) References Cited

U.S. PATENT DOCUMENTS 4,640,629 A * 2/1987 Antonini ................... G01J 5/20
374/185
5,158,366 A * 10/1992 Nagai ................. F27D 21/0014
374/185
(Continued)

FOREIGN PATENT DOCUMENTS

CN      204991880 U    1/2016
CN      206789655 U   12/2017
(Continued)

OTHER PUBLICATIONS

"Cathode, Anode and Electrolyte—Battery Design" at < Cathode, Anode and Electrolyte—Battery Design> . downloaded Nov. 12, 2024.*

(Continued)

*Primary Examiner* — Randy W Gibson
(74) *Attorney, Agent, or Firm* — Tucker Ellis LLP; Michael G. Craig

(57) ABSTRACT

An electrical device including a surface which may be exposed to heat derived from operation of the electrical device such that the temperature of the surface increases during operation. The surface includes a temperature sensor including first and second electrodes separated by a layer of control material. The material properties and/or configuration of the control material are selected such that the electrical conductivity of the control material increases with increasing temperature so that electrical current is able to pass between the first and second electrodes once the temperature of any part of the control material has reached or exceeded a predetermined temperature. The temperature sensor extends over substantially the whole of the surface. A system including the electrical device and a method of controlling the electrical device is also disclosed.

23 Claims, 4 Drawing Sheets

(56) References Cited

U.S. PATENT DOCUMENTS

| | | | | |
|---|---|---|---|---|
| 5,410,291 | A | * | 4/1995 | Kuzuoka ............ G01D 11/245 374/185 |
| 5,695,859 | A | * | 12/1997 | Burgess ............... H01H 3/141 428/209 |
| 6,975,047 | B2 | * | 12/2005 | Pippin ............... G06F 11/3093 374/173 |
| 7,629,073 | B2 | | 12/2009 | Cho et al. |
| 7,745,040 | B2 | | 6/2010 | Chang et al. |
| 7,944,360 | B2 | | 5/2011 | Kim et al. |
| 8,017,268 | B2 | | 9/2011 | Kim et al. |
| 8,305,221 | B2 | | 11/2012 | Kim et al. |
| 9,178,126 | B2 | | 11/2015 | Kim et al. |
| 2005/0206494 | A1 | | 9/2005 | Ko et al. |
| 2005/0210905 | A1 | * | 9/2005 | Burns ..................... G06F 1/324 257/E23.08 |
| 2007/0292751 | A1 | | 12/2007 | Cherng et al. |
| 2009/0011324 | A1 | | 1/2009 | Heinrich |
| 2011/0006830 | A1 | | 1/2011 | Kim et al. |
| 2012/0311357 | A1 | * | 12/2012 | Andrews ............. G06F 1/3203 713/320 |
| 2013/0004811 | A1 | | 1/2013 | Banerjee et al. |
| 2016/0223269 | A1 | | 8/2016 | Hartmann et al. |
| 2017/0045402 | A1 | | 2/2017 | Francke |
| 2020/0401199 | A1 | * | 12/2020 | Limaye ................ G06F 1/324 |

FOREIGN PATENT DOCUMENTS

| | | |
|---|---|---|
| CN | 206931666 U | 1/2018 |
| CN | 207082615 U | 3/2018 |
| CN | 108199090 A | 6/2018 |
| EP | 2833374 B1 | 2/2020 |
| KR | 10-0615164 B1 | 8/2006 |
| WO | 99/00004 A2 | 1/1999 |
| WO | 00/25325 A1 | 5/2000 |

OTHER PUBLICATIONS

Choi et al., "Control of current-jump induced by voltage, temperature, light in p-type GaAs: Programmable critical temperature sensor", Applied Physics Letters, vol. 95, No. 23, 2009, pp. 231910-231910.

International Search Report and Written Opinion received for PCT Patent Application No. PCT/GB2020/053120, mailed on Apr. 28, 2021, 15 pages.

Office Action received for GB Application No. 1918464.7, mailed on Dec. 24, 2021, 3 page.

Search Report received for GB Application No. 1918464.7 mailed on Jun. 9, 2020, 2 page.

* cited by examiner

HOT-SPOT DETECTION IN ELECTRICAL DEVICES

CROSS-REFERENCE TO PRIOR APPLICATION

This application is a § 371 National Stage Application of PCT International Application No. PCT/GB2020/053120 filed Dec. 4, 2020, which claims the priority of United Kingdom Application No. 1918464.7, filed Dec. 16, 2019, each of which are herein incorporated by reference in their entirety.

TECHNICAL FIELD

The present disclosure relates to hot-spot detection in electrical devices. In particular, the present disclosure relates to the detection of hot-spots at any position on a surface of an electrical device. The disclosure also relates to a system and method for controlling an electrical device in dependence on the detection of a hot-spot.

BACKGROUND

It is well known that electrical devices produce heat during operation. Examples of such electrical devices include motors, fans, pumps, generators, heaters and batteries. Some amount of heat production is to be expected during normal operation of such electrical devices. However, if an electrical device experiences a fault, or is operated for an extended period of time, the heat produced may become excessive.

For consumer electrical devices, such as home care or personal care devices, the heat generated may cause injury to a user if external surfaces of the device become too hot to touch and able to burn. In all cases, excessive heat production can lead to device damage and in extreme cases to fire.

Rechargeable, or secondary, batteries are particularly sensitive to high temperatures as the life-span of secondary batteries is reduced as a result of high temperature operation. In addition, secondary batteries run the risk of thermal run-away in the event of damage, short circuit, or overcharging. Thermal run-away, particularly in modern lithium-ion secondary batteries, can lead to battery fires and explosion if not properly managed.

It is against this background that the present invention has been devised.

SUMMARY OF THE INVENTION

The present invention provides an electrical device comprising a surface, the surface comprising a temperature sensor extending over substantially the whole of the surface, the temperature sensor comprising first and second electrodes separated by a layer of control material, wherein the material properties and/or configuration of the control material is such that the electrical conductivity of the control material increases with increasing temperature so that, in use, electrical current is able to pass between the first and second electrodes once the temperature of any part of the control material has reached or exceeded a predetermined temperature, wherein the temperature sensor extends over substantially the whole of the surface.

Advantageously, a hot spot occurring on any part of the surface comprising the temperature sensor is able to be detected. For instance, the surface may be exposed to heat derived from operation of the electrical device such that the temperature of the surface may increase during operation of the electrical device.

Optionally, the temperature sensor comprises an additional electrode separated from the second electrode by an additional layer of control material, wherein the material properties and/or configuration of the additional layer of control material are selected such that the electrical conductivity of the control material increases with increasing temperature so that electrical current is able to pass between the additional and second electrodes once the temperature of any part of the additional layer of control material has reached or exceeded a second predetermined temperature. Thus, a first, or pre-warning temperature occurring on the surface comprising the temperature sensor can be detected before the surface reaches a second, more critical, temperature.

The surface may optionally comprise a second temperature sensor comprising third and fourth electrodes separated by a second layer of control material, wherein the material properties and/or configuration of the second layer of control material are selected such that the electrical conductivity of the control material increases with increasing temperature so that electrical current is able to pass between the third and fourth electrodes once the temperature of any part of the second layer of control material has reached or exceeded a second predetermined temperature. Again, with this configuration a first, or pre-warning temperature occurring on the surface comprising the temperature sensor can be detected before the surface reaches a second, more critical, temperature.

The second temperature sensor optionally extends over substantially the whole of the surface for maximum detector coverage.

The or each control material may be selected from the group consisting of a thermistor material, a thermoelectric material, a phase change material, or a metal-insulator transition (MIT) material.

Optionally, the or each temperature sensor may be covered by a protective layer or be contained within a protective cover.

The electrical device may comprise a battery, a motor, or a heater.

The electrical device may comprise a battery cell which may comprise an electrode assembly comprising an anode current collector and a cathode current collector located on either side of a separator material.

Optionally, a first battery cell and a second battery cell may be provided, wherein the or each temperature sensor is sandwiched between the first and second battery cells to provide hot-spot detection between the cells.

The or each temperature sensor may optionally have substantially the same footprint as the anode current collector and/or the cathode current collector to ensure hot-spot detection over these areas.

Optionally the electrode assembly has the form of a jelly-roll, and wherein the or each temperature sensor is located substantially in the middle of the jelly-roll electrode assembly to allow hot-spot detection in the middle of the jelly-roll.

The or each battery cell may be located within a housing.

The surface may optionally comprise at least a portion of an outer housing of the electrical device and the or each temperature sensor may be located on an interior or exterior surface of the outer housing. Alternatively or additionally, the temperature sensor may be embedded within the material of the outer housing.

In another aspect, the present invention provides a system comprising an electrical device as described above and a hot-spot detector comprising a processor configured to receive an input signal, wherein the input signal is indicative of a flow of current in a sensor circuit connected to the electrodes of a temperature sensor of the electrical device, wherein the processor is configured to output a control signal in dependence on the indicated presence of current flow in the sensor circuit.

Optionally the processor may be configured to receive a second input signal, wherein the second input signal is indicative of a flow of current in a second sensor circuit connected to the electrodes of a second temperature sensor of the electrical device, wherein the processor is configured to output a second control signal in dependence on the indicated presence of current flow in the second sensor circuit.

The system may optionally comprise a controller configured to modify a master current flow to and/or from the electrical device upon output of a control signal from the processor.

The system may comprise a battery management system, wherein the electrical device comprises a battery, and wherein the master current flow is an electrical current derived from the battery or an electrical current provided to the battery for the purpose of charging the battery.

In a further aspect, the present invention provides a method of controlling an electrical device as described above, the method comprising: sensing a flow of current in a sensor circuit connected to the electrodes of a temperature sensor of the electrical device; issuing a control signal to a controller upon sensing of the flow of current in the sensor circuit; and using the controller to modify a master current flow to and/or from the electrical device upon receipt of the control signal.

Optionally the method may comprise: sensing a second flow of current in a second sensor circuit connected to the electrodes of a second temperature sensor of the electrical device; issuing a second control signal to a controller upon sensing of the second flow of current; and using the controller to further modify the master current flow to and/or from the electrical device upon receipt of the second control signal.

A first master current control protocol may be initiated upon receipt of the first control signal, and a second master current control protocol may be initiated upon receipt of the second control signal.

Optionally the second master current control protocol may comprise substantially stopping the master current flow to and/or from the electrical device.

BRIEF DESCRIPTION OF THE DRAWINGS

The present invention will now be described by way of non-limiting examples with reference to the following figures, in which.

DETAILED DESCRIPTION

Figure 1:
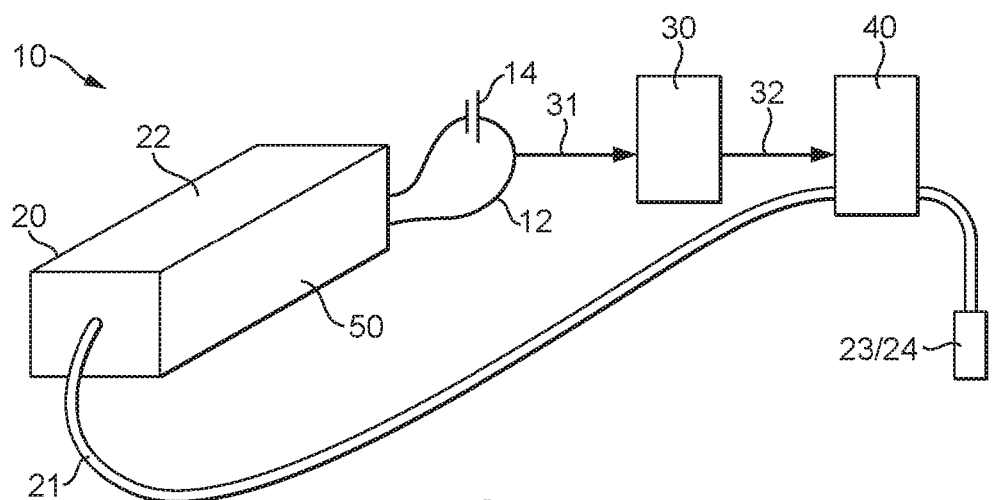
FIG. 1 shows a schematic representation of a system comprising an electrical device, a processor and a controller.

FIG. 1 shows a schematic illustration of a system 10 comprising an electrical device 20, a processor 30 and a controller 40. The electrical device 20 could be any electrical device capable of producing heat during operation. Examples include motors, fans, pumps, generators, heaters and batteries.

The electrical device 20 is connected to a master power cable 21 which carries a master current flow when the electrical device 20 is operational. Depending on the type of electrical device, the master current flow may be a supply of current to the electrical device 20 from a power source 23 (for example in the case of a motor, heater, or fan), or may be a flow of current from the electrical device to a power consumer 24 (for example in the case of a generator or battery). In the specific case of a battery, the master current flow may be a flow of current from the battery to another electrical device such as a phone, laptop or drive motor of an electric vehicle, or it may be a flow of current to the battery for the purpose of charging the battery.

Figure 2:
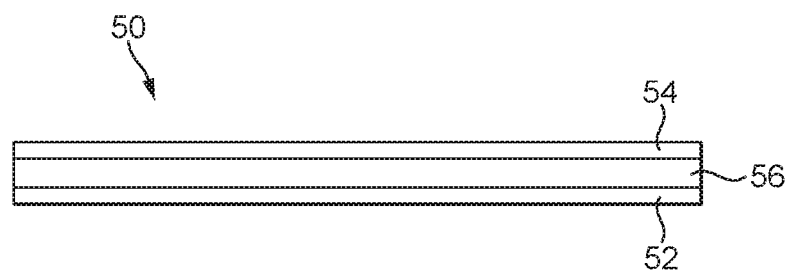
FIG. 2 shows a schematic representation of a temperature sensor.

Substantially the whole of the outer surface 22 of the electrical device 20 is covered by a temperature sensor 50 as a thin film. Referring to FIG. 2, the temperature sensor 50 comprises a first electrode 52 and a second electrode 54 separated by a layer of control material 56. The control material 56 is configured so that the electrical conductivity of the control material increases with increasing temperature so that electrical current is able to pass between the first and second electrodes once the temperature of any part of the control material has reached or exceeded a predetermined temperature. The control material therefore acts as an electrical insulator below a predetermined temperature, preventing electrical current flow between the first and second electrodes 52, 54. However, if any part of the outer surface 22 of the electrical device 20 reaches the predetermined temperature (or exceeds the predetermined temperature), the material properties of the control material 56 change such that electrical current is able to flow between the first and second electrodes 52, 54. Therefore, the temperature sensor 50 is able to detect the existence of a hot-spot on any part of the outer surface 22 of the electrical device 20.

Suitable materials for the control material 56 include thermistor materials (such as ferric oxide, nickel oxide, barium titanate or polymers), thermoelectric materials (such as bismuth chalcogenides and lead telluride), phase change materials (such as parafins, lipids and salt hydrides), and metal insulator transition (MIT) materials (such as vanadium dioxide, silicon dioxide and titanium dioxide).

A suitable MIT material is vanadium dioxide ($VO_2$) which can be finely tuned by the addition of dopants such as hydrogen, iron, cobalt, nickle, molybdenum, columbium, hafnium, magnesium, germanium, sodium, potassium, titanium, silicon and tungsten to change its behaviour from that of an electrical insulator below a predetermined temperature, to that of an electrical conductor above the predetermined temperature. For example, control material 56 made from $VO_2$ can be tuned to change its behaviour from an insulator to a conductor at 80° C., 90° C., or 100° C. It will be understood that these are example temperatures only and that the control material 56 may be tuned to change its electrical conductivity characteristic at any suitable temperature within the range allowed for by the particular control material 56.

Referring once again to FIG. 1, the first and second electrodes 52, 54 of the temperature sensor 50 are connected to a sensor circuit 12 having a sensor power supply 14. In normal operating conditions, when the temperature of the outer surface 22 of the electrical device 20 is below the predetermined temperature, no current flows in the sensor circuit 12 as current is not able to pass between the first and second electrodes 52, 54 through the control material 56. However, if any part of the outer surface 22 reaches or exceeds the predetermined temperature, resulting in a hot-spot, the electrical conductivity of the control material 56 in the region of the hot-spot increases so the current is able to flow between the first and second electrodes 52, 54. Of course, current will be able to flow between the first and second electrodes 52, 54 if the whole or a substantial part of the outer surface 22 reaches or exceeds the predetermined temperature.

The processor 30 has an input 31 which is arranged to have a zero value when there is no electrical current flow in the sensor circuit 12, and a non-zero value when there is an electrical current flow in the sensor circuit 12. The input 31 to the processor 30 is therefore indicative of a flow of current in the sensor circuit 12.

The processor 30 is configured to output a control signal 32 upon the input of a non-zero value to the input 31 indicative of a flow of current in the sensor circuit 12. The output signal 32 is received by the controller 40 which is configured to modify the master current flow in the master cable 21.

In the case where the master cable 21 supplies power to the electrical device 20 from a power source 23, the controller 40 may be configured to stop, or reduce, the master current flow in order to shut down the operation of the electrical device 20 permanently, or until the electrical device 20 has cooled sufficiently to allow normal operation to resume. Alternatively, (or additionally in the case of a battery), in the case where the master cable 21 provides power to an electrical consumer 24 from the electrical device 20, the controller 40 may be configured to stop, or reduce, the master current flow permanently, or until the electrical device 20 has cooled sufficiently to allow normal operation to resume.

Figure 3:
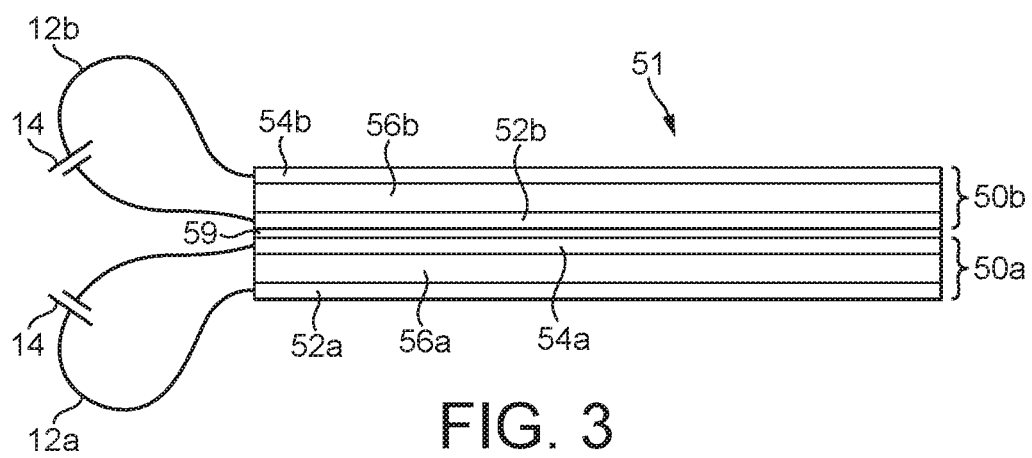
FIG. 3 shows a schematic representation of another temperature sensor.

FIG. 3 shows another example of a temperature sensor 51. For reasons of clarity, the same reference numerals are used throughout the description to indicate like components. The temperature sensor 51 comprises two temperature sensors 50a, 50b located one on top of the other separated by an electrical insulation layer 59. The first temperature sensor 50a comprises a first electrode 52a and a second electrode 54a separated by a control material 56a. The second temperature sensor 50b comprises a third electrode 52b and a fourth electrode 54b separated by a control material 56b. The first control material 56a is configured to change from an electrical insulator to an electrical conductor at a first predetermined temperature, and the second control material 56b is configured to change from an electrical insulator to an electrical conductor at a second predetermined temperature which is greater than the first predetermined temperature. In this way, the temperature sensor 51 is able to detect when any part of the outer surface 22 of the electrical device 20 reaches the first predetermined temperature and when the same (or any other) part of the outer surface 22 reaches the second predetermined temperature.

The first and second electrodes 52a, 54a of the first temperature sensor 50a are connected to a first sensor circuit 12a which is connected to a sensor power source 14, and the third and fourth electrodes 52b, 54b of the second temperature sensor 50b are connected to a second sensor circuit 12b which is connected to a sensor power source 14.

Figure 4:
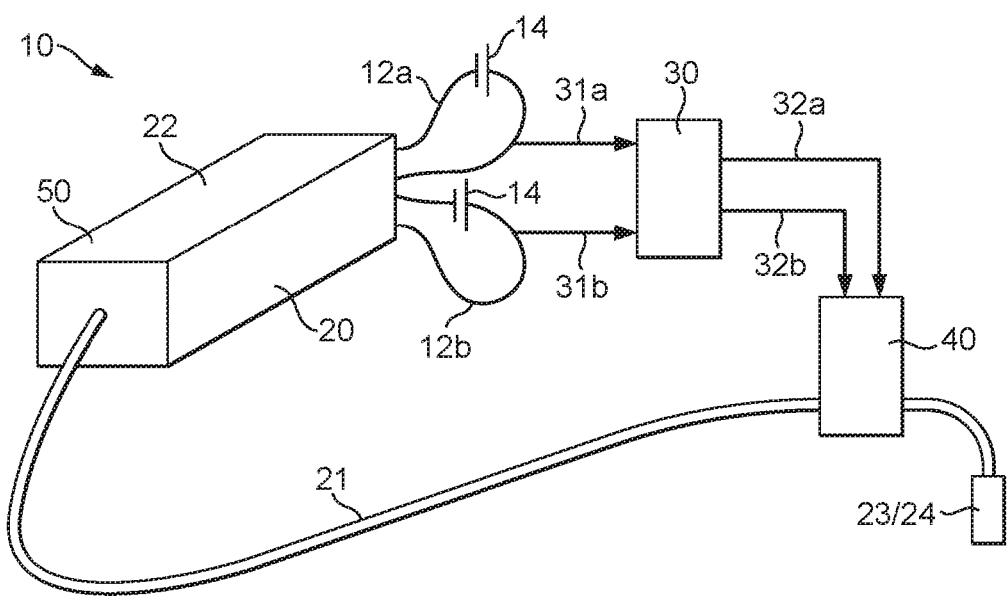
FIG. 4 shows a schematic representation of another system comprising an electrical device, a processor and a controller.

Referring now to FIG. 4, in normal operating conditions, when the temperature of the outer surface 22 of the electrical device 20 is below the first predetermined temperature, no current flows in the either sensor circuit 12a, 12b as current is not able to pass between the first and second electrodes 52a, 54a through the first control material 56a, or through the third and fourth electrodes 52b, 54b through the second control material 56b. However, if any part of the outer surface 22 reaches or exceeds the first predetermined temperature, resulting in a hot-spot, the electrical conductivity of the first control material 56a in the region of the hot-spot increases so current is able to flow between the first and second electrodes 52a, 54a. This results in current flow in the first sensor circuit 12a.

Similarly, if any part of the outer surface 22 reaches or exceeds the second predetermined temperature, the electrical conductivity of the second control material 56b in the region of the hot-spot increases so the current is able to flow between the third and fourth electrodes 52b, 54b. This results in current flow in the second sensor circuit 12b.

The processor 30 is configured to receive two inputs. The first input 31a is arranged to have a zero value when there is no electrical current flow in the first sensor circuit 12a, and a non-zero value when there is an electrical current flow in the first sensor circuit 12a. The first input 31a to the processor 30 is therefore indicative of a flow of current in the first sensor circuit 12a. Similarly, the second input 31b is arranged to have a zero value when there is no electrical current flow in the second sensor circuit 12b, and a non-zero value when there is an electrical current flow in the second sensor circuit 12b. The second input 31b is therefore indicative of a flow of current in the second sensor circuit 12b.

The processor 30 is configured to output two control signals. The first control signal 32a is issued upon receipt of a non-zero value first input 31a, indicative of a flow of current in the first sensor circuit 12a, and the second control signal 32b is issued upon receipt of a non-zero value second input 31b, indicative of a flow of current in the second sensor circuit 12b. The output signals 32a, 32b are received by a controller 40 which is configured to modify the master current flow in the master cable 21 in dependence on the receipt of the output signals 32a, 32b from the processor 30.

The controller 40 may be configured to reduce the master current flow upon receipt of the first control signal 32a, and configured to stop the master current flow upon receipt of the second control signal 32b. Alternatively, or additionally, the controller 40 may be configured to issue an alarm signal upon receipt of the first control signal 32a to indicate to a user, or to an automated control system, that the first predetermined temperature has been reached somewhere on the surface 22 of the electrical device 20. This then allows the user or control system to intervene, or run diagnostic tests, before the second predetermined temperature is reached.

Figure 5:
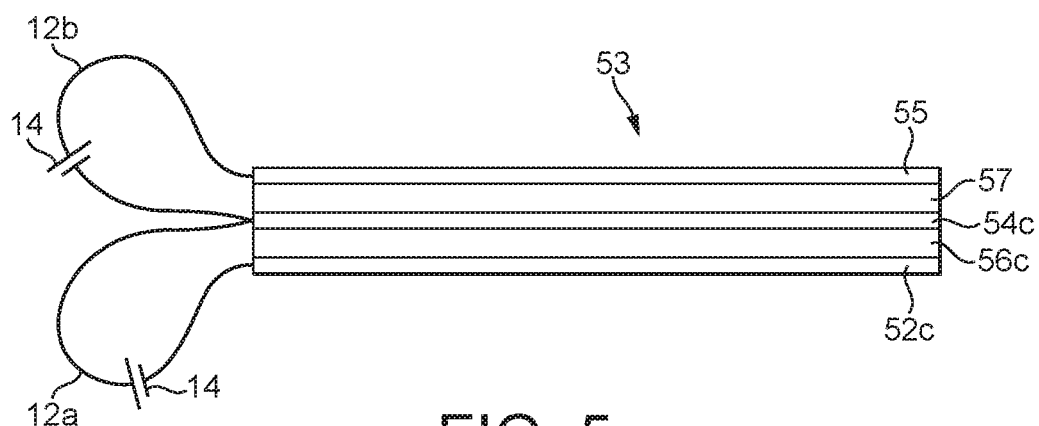
FIG. 5 shows a schematic representation of yet another temperature sensor.

FIG. 5 shows a third example of a temperature sensor 53 comprising a first electrode 52c and a second electrode 54c separated by a control material 56c. An additional electrode 55 is located proximate the second electrode 54c and separated from the second electrode 54c by an additional layer of control material 57. The temperature sensor 53 of FIG. 5 operates in much the same way as the temperature sensor 51 of FIG. 3 in that the two layers of control material 56c, 57 are configured to change from an electrical insulator to an electrical conductor at two different predetermined temperatures. In the case of the temperature sensor 53, electrical current is able to flow in the first sensor circuit 12a if the first predetermined temperature is reached such that current may flow between the first and second electrodes 52c, 54c through the first control material 56c, and current is able to flow in the second sensor circuit 12b if the second predetermined temperature is reached such that current may flow between the second and additional electrodes 54c, 55 through the second control material 57. The processer 30 and controller 40 then operate to control the system 10 in the same way as described above in relation to FIG. 4.

Figure 6:
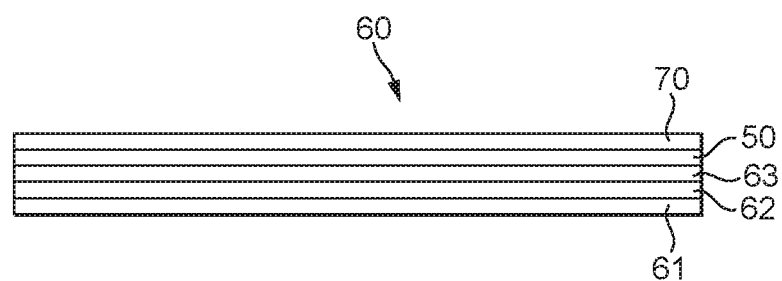
FIG. 6 shows a schematic representation of a battery cell comprising temperature sensor.

FIG. 6 shows a battery cell comprising an anode electrode 61 and a cathode electrode 63 separated by a separator layer 62. Electrolyte is contained within the separator layer 62. A temperature sensor 50 is located next to the cathode 63 and a layer of protective material 70, such as polypropylene or polyethylene terephthalate (PET), is located next to the temperature sensor 50. It will be understood that the temperature sensor may correspond to any of the temperature sensors 50, 51, 53 described above, and that the temperature sensor 50, 51, 53 may be located next to the anode 61 instead of, or in addition to, the cathode 63. In the case where there is a temperature sensor 50, 51, 53 located on both sides of the battery cell 60, one or both may be covered by a protective material layer 70. Alternatively, the entire battery cell 60, including the or each temperature sensor 50, 51, 53, may be located within a protective material pouch.

Figure 7:
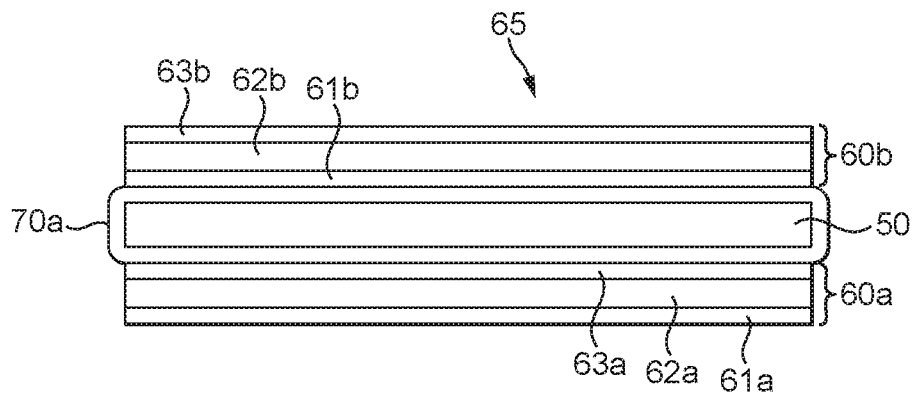
FIG. 7 shows a schematic representation of a stack of two battery cells comprising a temperature sensor sandwiched between them.

FIG. 7 shows an alternative battery arrangement 65 comprising first and second battery cells 60a, 60b arranged in a stack. The first battery cell 60a comprises first anode 61a and a first cathode 63a separated by a first separator layer 62a. The second battery cell 60b comprises a second anode 61b and a second cathode 63b separated by a first separator layer 62b. A temperature sensor 50 is sandwiched between the first and second battery cells 60a, 60b. The temperature sensor 50 is contained within a protective material pouch 70a, for example a polypropylene pouch. Alternatively, one or both sides of the temperature sensor 50 may be covered by a protective material layer, or there may be no protective material layer included at all. It will be understood that the temperature sensor may correspond to any of the temperature sensors 50, 51, 53 described above.

Although only two battery cells 60a, 60b are shown in FIG. 7, it will be understood that the battery 65 may comprise multiple battery cells 60 arranged in a stack with temperature sensors 50, 51, 53 located between some or all of the battery cells 60.

Figure 8:
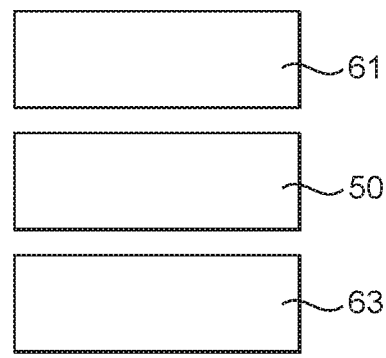
FIG. 8 shows a schematic view of a partially exploded plan view of the battery cell of FIG. 6.

FIG. 8 shows a schematic partially exploded plan view of the battery cell 60 of FIG. 6. Here it can be seen that the footprint of the temperature sensor 50, 51, 53 is substantially the same as the footprint of the anode 61 and cathode 63. This allows hot spots occurring in any part of the battery cell 60 to be sensed by the temperature sensor 50, 51, 53. The temperature sensor(s) 50, 51, 53 of FIG. 7 also have the same arrangement such that hot spots occurring in any part of the battery cells 60a, 60b can be sensed by the temperature sensor 50, 51, 53. Because of the location of the film temperature sensor 50, 51, 53 in between the battery cells 60a, 60b of FIG. 7, it is possible for hot spots to be detected in the middle of the battery 65 as well as on the outer surface(s) where additional temperature sensors 50, 51, 53 may be located.

Figure 9:
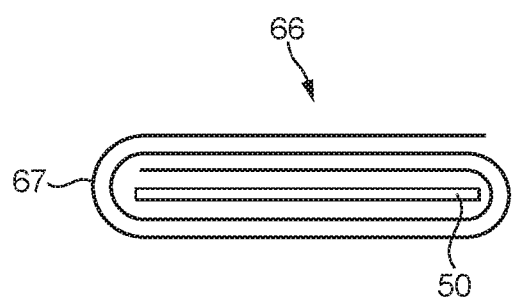
FIG. 9 shows a schematic representation of a temperature sensor located within a jelly-roll electrode assembly.

FIG. 9 shows a further alternative battery cell arrangement 66. The battery cell of FIG. 9 comprises a "jelly-roll" type electrode assembly 67 comprising an anode and a cathode located on either side of a separator and rolled into a substantially flat spiral form. The battery cell 66 comprises a temperature sensor 50, 51, 53 located substantially at the centre of the jelly roll electrode assembly 67 for sensing hot spots within the jelly roll electrode assembly 67. One or more temperature sensors 50, 51, 53 may also be located on the outer surface of the jelly roll electrode assembly 67. The temperature sensors 50, 51, 53 may comprise a protective material layer 70, or may be located within a protective material pouch.

Figure 10:
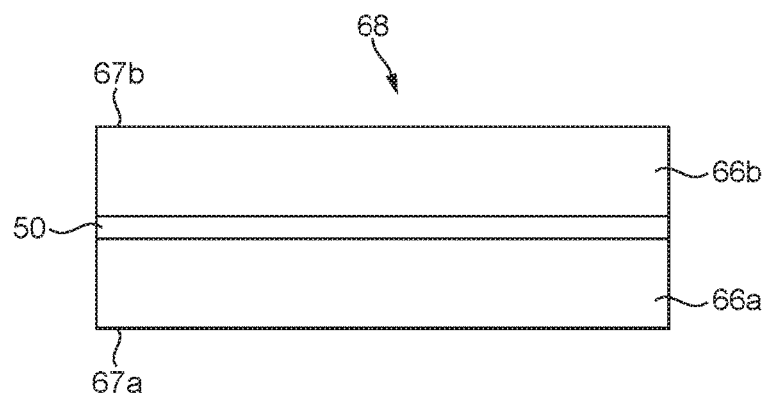
FIG. 10 shows a schematic representation of another stack of battery cells comprising a temperature sensor.

FIG. 10 shows an alternative battery 68 comprising two jelly-roll battery cells 66a, 66b located in a stack. The first jelly-roll battery cell 66a comprises a first jelly-roll electrode assembly 67a, and the second jelly-roll battery cell 66b comprises a second jelly-roll electrode assembly 67b. A temperature sensor 50 is sandwiched between the first and second jelly-roll battery cells 66a, 66b. The temperature sensor 50 may be contained within a protective material pouch. Alternatively, one or both sides of the temperature sensor 50 may be covered by a protective material layer, or there may be no protective material layer included at all. It will be understood that the temperature sensor may correspond to any of the temperature sensors 50, 51, 53 described above. In addition, the jelly-roll battery cells 66a, 66b may or may not contain a temperature sensor 50, 51, 53 located at their centres depending on design choice.

Although only two jelly-roll battery cells 66a, 66b are shown in FIG. 9, it will be understood that the battery 68 may comprise multiple jelly-roll battery cells 66 arranged in a stack with temperature sensors 50, 51, 53 located between some or all of the jelly-roll battery cells 66.

Figure 11A:
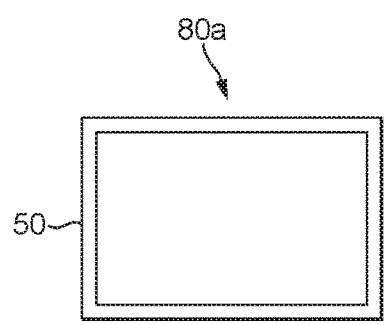
FIGS. 11a, 11b, and 11c show schematic representations of alternative locations for the temperature sensor.
Figure 11B:
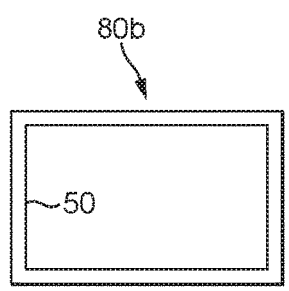
Figure 11C:
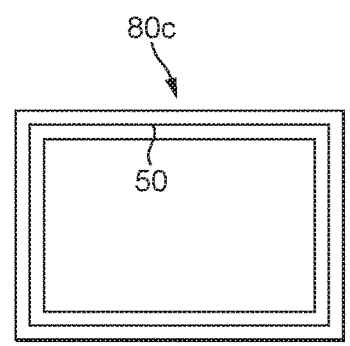

FIGS. 11a to 11c show a schematic representation of a section through an outer housing 80a, 80b, 80c which might form the outer housing of an electrical device 20 according to any of the above described embodiments. The housing 80a, 80b, 80c may be made of a rigid or flexible material.

As shown in FIG. 11a, the outer housing 80a has a temperature sensor 50 located on the outer surface of the housing 80a. Substantially the whole of the outer surface of the housing 80a may be covered by a single temperature sensor 50. Alternatively, a plurality of temperature sensors 50 may be used to cover the outer surface of the housing 80a. In another alternative, only part of the outer surface of the housing 80a may be covered by one or more temperature sensors 50.

FIG. 11b shows an outer housing 80b having a temperature sensor 50 located on the inner surface of the outer housing 80b. Substantially the whole of the inner surface of the housing 80b may be covered by a single temperature sensor 50. Alternatively, a plurality of temperature sensors 50 may be used to cover the inner surface of the housing 80b. In another alternative, only part of the inner surface of the housing 80b may be covered by one or more temperature sensors 50.

FIG. 11c shows an outer housing 80c having a temperature sensor 50 embedded in the material of the outer housing 80c. Substantially the whole of the outer housing 80c may have a single temperature sensor 50 embedded within it. Alternatively, a plurality of temperature sensors 50 may be embedded within the outer housing 80c. In another alternative, only part of the outer housing 80c may be comprise one or more embedded temperature sensors 50. It will be understood that the temperature sensor of the housings 80a, 80b, 80c may correspond to any of the temperature sensors 50, 51, 53 described above.

The invention claimed is:

1. An electrical device comprising a surface, the surface comprising:
    a first temperature sensor extending over substantially the whole of the surface, the first temperature sensor comprising first and second electrodes separated by a layer of control material, wherein the material properties and/or configuration of the control material is such that the electrical conductivity of the control material increases with increasing temperature so that, in use, electrical current is able to pass between the first and second electrodes once the temperature of any part of the control material has reached or exceeded a predetermined temperature; and
    a second temperature sensor comprising third and fourth electrodes separated by a second layer of control material, wherein the material properties and/or configuration of the second layer of control material are selected such that the electrical conductivity of the control material increases with increasing temperature so that electrical current is able to pass between the third and fourth electrodes once the temperature of any part of the second layer of control material has reached or exceeded a second predetermined temperature;
    wherein the first temperature sensor and the second temperature sensor are separated by an electrical insulation layer.

2. The electrical device as claimed in claim 1, wherein the first temperature sensor comprises an additional electrode separated from the second electrode by an additional layer of control material, wherein the material properties and/or configuration of the additional layer of control material are selected such that the electrical conductivity of the control material increases with increasing temperature so that electrical current is able to pass between the additional and second electrodes once the temperature of any part of the additional layer of control material has reached or exceeded a second predetermined temperature.

3. The electrical device as claimed in claim 1, wherein the second temperature sensor extends over substantially the whole of the surface.

4. The electrical device as claimed in claim 1, wherein the or each control material is selected from the group consisting of a thermistor material, a thermoelectric material, a phase change material, or a metal-insulator transition (MIT) material.

5. The electrical device as claimed in claim 1, wherein the or each temperature sensor is covered by a protective layer or is contained within a protective cover.

6. The electrical device as claimed in claim 1, wherein the electrical device comprises a battery, a motor, or a heater.

7. The electrical device as claimed in claim 1, wherein the electrical device comprises a battery cell.

8. The electrical device as claimed in claim 7, wherein the battery cell comprises an electrode assembly comprising an anode current collector and a cathode current collector located on either side of a separator material.

9. The electrical device as claimed in claim 7, comprising a first battery cell and a second battery cell, wherein the or each temperature sensor is sandwiched between the first and second battery cells.

10. The electrical device as claimed in claim 8, wherein the or each temperature sensor has substantially the same footprint as the anode current collector and/or the cathode current collector.

11. The electrical device as claimed in claim 8, wherein the electrode assembly has the form of a jelly-roll, and wherein the or each temperature sensor is located substantially in the middle of the jelly-roll electrode assembly.

12. The electrical device as claimed in claim 7, wherein the or each battery cell is located within a housing.

13. The electrical device as claimed in claim 1, wherein the surface comprises at least a portion of an outer housing of the electrical device.

14. The electrical device as claimed in claim 13, wherein the or each temperature sensor is located on an interior or exterior surface of the outer housing.

15. The electrical device as claimed in claim 13, wherein the first temperature sensor is embedded within the material of the outer housing.

16. A system comprising the electrical device according to claim 1; and
    a hot-spot detector comprising a processor configured to receive an input signal, wherein the input signal is indicative of a flow of current in a sensor circuit connected to the electrodes of one or more of the temperature sensors of the electrical device, wherein the processor is configured to output a control signal in dependence on the indicated presence of current flow in the sensor circuit.

17. The system as claimed in claim 16, wherein the processor is configured to receive a second input signal, wherein the second input signal is indicative of a flow of current in a second sensor circuit connected to the electrodes of the second temperature sensor of the electrical device, wherein the processor is configured to output a second control signal in dependence on the indicated presence of current flow in the second sensor circuit.

18. The system as claimed in claim 16, comprising a controller configured to modify a master current flow to and/or from the electrical device upon output of a control signal from the processor.

19. The system according to claim 18, wherein the electrical device comprises a battery, and wherein the master current flow is an electrical current derived from the battery or an electrical current provided to the battery for the purpose of charging the battery.

20. A method of controlling the electrical device according to claim 1, the method comprising:
    sensing a flow of current in a sensor circuit connected to the electrodes of the first temperature sensor of the electrical device;
    issuing a control signal to a controller upon sensing of the flow of current in the sensor circuit; and
    using the controller to modify a master current flow to and/or from the electrical device upon receipt of the control signal.

21. The method according to claim 20, further comprising:
    sensing a second flow of current in a second sensor circuit connected to the electrodes of the second temperature sensor of the electrical device;
    issuing a second control signal to a controller upon sensing of the second flow of current; and
    using the controller to further modify the master current flow to and/or from the electrical device upon receipt of the second control signal.

22. The method according to claim 21, wherein a first master current control protocol is initiated upon receipt of the first control signal, and wherein a second master current control protocol is initiated upon receipt of the second control signal.

23. The method according to claim 22, wherein the second master current control protocol comprises substantially stopping the master current flow to and/or from the electrical device.

* * * * *